US011363704B1

(12) United States Patent
Bucher et al.

(10) Patent No.: US 11,363,704 B1
(45) Date of Patent: *Jun. 14, 2022

(54) COLOR CHANGING LED (LIGHT EMITTING DIODE) MODULE FOR CEILING FANS

(71) Applicant: Chien Luen Industries Co., Ltd., Inc., Oakland Park, FL (US)

(72) Inventors: Charles E. Bucher, Tampa, FL (US); Zachary Zauhar, Oakland Park, FL (US)

(73) Assignee: CHIEN LUEN INDUSTRIES CO., LTD., INC., Oakland Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/151,144

(22) Filed: Jan. 16, 2021

Related U.S. Application Data

(62) Division of application No. 16/713,801, filed on Dec. 13, 2019, now Pat. No. 10,897,806, which is a division of application No. 15/934,553, filed on Mar. 23, 2018, now Pat. No. 10,568,187.

(51) Int. Cl.

| | |
|---|---|
| ***B60Q 1/124*** | (2006.01) |
| ***H05B 47/19*** | (2020.01) |
| ***H05B 45/20*** | (2020.01) |
| ***F21V 33/00*** | (2006.01) |
| ***F21V 21/03*** | (2006.01) |

(52) U.S. Cl.
CPC ............. *H05B 47/19* (2020.01); *F21V 21/03* (2013.01); *F21V 33/0096* (2013.01); *H05B 45/20* (2020.01)

(58) Field of Classification Search
CPC ................ H05B 37/02; H05B 33/0884; H05B 33/0857; H05B 47/19; H05B 45/20; H05B 45/00; H05B 45/14; H05B 45/46; H05B 45/60; F21V 21/02; F21V 33/06; F21V 21/03; F21V 33/0096; F21V 23/04; F21S 10/02; F21Y 2115/10; F21Y 2115/15; F21K 9/00
See application file for complete search history.

(56) References Cited

U.S. PATENT DOCUMENTS

| | | | |
|---|---|---|---|
| 4,766,353 | A | 8/1988 | Burgess |
| 4,879,495 | A | 11/1989 | Yamamoto |
| 4,896,079 | A | 1/1990 | Tabor |
| 5,610,488 | A | 3/1997 | Miyazawa |
| 7,688,005 | B2 | 3/2010 | Reid |

(Continued)

FOREIGN PATENT DOCUMENTS

WO WO-2012145766 A2 * 10/2012 ............. H05B 45/22

OTHER PUBLICATIONS

USAI Lighting, LLC, Color Select Tunable White, 2018, retrieved Mar. 5, 2018, http://www.usailighting.com/color-select, 11 pages.

*Primary Examiner* — Omar Rojas Cadima
(74) *Attorney, Agent, or Firm* — Brian S. Steinberger; Hilary F. Steinberger; Law Offices of Brian S. Steinberger, P.A.

(57) ABSTRACT

Modules, devices, systems and methods that allow for remotely changing the white colors of LEDS (light emitting diodes) in overhead or wall mounted lights, as well as in ceiling fan lights by a remote control or wall switch, without requiring a three-position mechanical switch mounted on the light.

20 Claims, 13 Drawing Sheets

(56) References Cited

U.S. PATENT DOCUMENTS

| | | | | |
|---|---|---|---|---|
| 7,990,073 | B2 | 8/2011 | Feldtkeller | |
| 8,456,109 | B1 | 6/2013 | Wray | |
| 8,581,520 | B1 | 11/2013 | Wray | |
| 9,144,131 | B2 | 9/2015 | Wray | |
| 9,301,359 | B2 | 3/2016 | Wray | |
| 9,844,114 | B2 | 12/2017 | Chowdhury et al. | |
| 10,568,187 | B1 | 2/2020 | Bucher | |
| 10,897,806 | B1 | 1/2021 | Bucher | |
| 2003/0048632 | A1 | 3/2003 | Archer | |
| 2006/0012987 | A9 | 1/2006 | Ducharme et al. | |
| 2009/0195189 | A1 * | 8/2009 | Zampini | H05B 45/20 315/295 |
| 2010/0308657 | A1 | 12/2010 | Bucher | |
| 2015/0189725 | A1 | 7/2015 | Karc et al. | |
| 2017/0105265 | A1 | 4/2017 | Sadwick | |
| 2021/0352792 | A1 * | 11/2021 | Bogart | H05B 47/19 |

* cited by examiner

COLOR CHANGING LED (LIGHT EMITTING DIODE) MODULE FOR CEILING FANS

RELATED APPLICATIONS

This application is a Divisional of U.S. patent application Ser. No. 16/713,801 filed Jan. 19, 2021, now U.S. Pat. No. 10,897,806, which is a Divisional Patent Application of U.S. patent application Ser. No. 15/934,553 filed Mar. 23, 2018, now U.S. Pat. No. 10,568,187. The entire disclosure of each of the applications listed in this paragraph are incorporated herein by specific reference thereto.

FIELD OF INVENTION

This invention relates to changing light colors, and in particular to modules, devices, systems and methods that allow for changing the white colors of LEDS (light emitting diodes) in overhead and wall lights and ceiling fan lights by a remote control or wall switch, without requiring a multi-position mechanical switch mounted on the light.

BACKGROUND AND PRIOR ART

FIG. 1 shows a prior art arrangement 1 of a three-position mechanical switch 4 for changing colors of a light having two arrays of LEDs (light emitting diodes). The three position switch 4 connects to the 120 VAC power supply 2 to a circuit board 8 having two arrays of LEDs (light emitting diodes). One array of LEDS can be set to a warm white color 2700K such as a yellowish white color. A second array of LEDs can be set to cool color 5000K, such as a daytime color, such as a bluish color. The three way mechanical switch is used to switch to the LED array of the 2700K, and separately to the LED array of the 5000K. The middle position regulates the power to both sets of LED arrays to get an intermittent color, such as a true white color, which can be 3000K.

For an overhead light, the three position mechanical switch is usually located on the overhead light itself. As a result of this location such, it is difficult and not convenient for the user to use the three position mechanical switch. For example, in a high ceiling location, the user generally has to climb a step stool or ladder to reach the three-way mechanical switch.

Thus, the need exists for solutions to the above problems with the prior art.

SUMMARY OF THE INVENTION

A primary objective of the present invention is to provide a white color changing LED module, device, system and method that can be controlled remotely, and does not require a multi position switch to select the color.

A secondary objective of the present invention is to provide a white color changing LED module, device, system and method that does not a require a user to operate a color control that must be mounted to an overhead or wall mounted light.

A third objective of the present invention is to provide a remote control device, system and method that is connected to a white color changing LED module, that does not a require a user to operate a color control that must be mounted to an overhead or wall mounted light.

A fourth objective of the present invention is to provide a wall control device, system and method that is connected to a white color changing LED module, that does not a require a user to operate a color control that must be mounted to an overhead or wall mounted light.

A fifth objective of the present invention is to provide a remote control device, system and method that is connected to a white color changing LED module, that switches the power off and on quickly to the white color changing LED module to remotely change the color of the LED module.

A sixth objective of the present invention is to provide a wall control device, system and method that is connected to a white color changing LED module, that switches the power off and on quickly to the white color changing LED module to remotely change the color of the LED module.

A color changing light system for white LED (light emitting diodes) light, can include a LED light module installed in a light having a plurality of white LEDs (light emitting diodes) and a color changing switch for remotely changing white light emitted from the light, wherein the color changing switch is not mounted on or adjacent to the light.

The light can include a ceiling fan with a light attachment.

The light can include a kit for use with a ceiling fan.

The light can be selected from at least one of an overhead mounted light and a wall mounted light.

The light can include 2 LED arrays that can be controlled independently to change the color of the white light The color changing switch can allow for the color of the light to be controlled by turning power off and on.

The color changing switch can include a wireless transmitter with a single color changing button to change the white color of the light.

The system can include a receiver for controlling power to the LED light module, wherein activating the single color changing button causes the receiver to switch power off and on to the LED light module to change the color of the light.

The color changing switch can include a wall control with a color changing button for providing a hardwired link to change the white color of the light.

The system can include a MCU for controlling power to the LED light module, wherein activating the single color changing button causes the MCU to switch power off and on to the LED light module to change the color of the light.

The color changing switch can include: a first light setting of approximately 2200K to approximately 2900K, a second light setting of approximately 3000k to approximately 3900 and a third light setting of approximately 4000K to approximately 6000k.

The color changing switch can include a first light setting of approximately 2200K to approximately 2900K, a second light setting of approximately 3000k to approximately 3800, a third light setting of approximately 3900K to approximately 4500k and a fourth light setting of approximately 4600K to approximately 6000k.

The color changing switch can include: a first light setting of approximately 2700K, a second light setting of approximately 3000k, a third light setting of approximately 3500k, a fourth light setting of approximately 4000k and a fifth light setting of approximately 5000K.

The system can include a first operation scenario wherein turning the color changing light switch from an on state to off and quickly turning the color changing light switch back on changes the light setting to go from a previous light setting to a next light setting in a series of colors.

If the previous light setting is a first light setting of approximately 2200K to approximately 2900K, the next light setting is a second light setting of approximately 3000k to approximately 3900. And if the previous light setting is the second light setting of approximately 3000k to approximately 3900, the next light setting is a third light setting of approximately 4000K to approximately 6000k. And if the previous light setting is the third light setting of approximately 4000K to approximately 6000k, the next light setting is the first light setting of approximately 2200K to approximately 2900K.

The system can include a second operation scenario wherein turning the color changing light switch from an on state having an existing setting to off and after a long period turning the color changing light switch back on repeats the existing light setting.

If the existing light setting is approximately 2200K to approximately 2900K turning the light off for the long period to back on turns the light back on to approximately 2200K to approximately 2900K. And if the existing light setting is approximately 3000k to approximately 3900 turning the light off for the long period to back on turns the light back on to approximately 3000k to approximately 3900. And if the existing light setting is approximately 4000K to approximately 6000k turning the light off for the long period to back on turns the light back on to approximately 4000K to approximately 6000k.

The LED light module can include an AC power switch detection, an LED controller connected to the AC power switch detection and a first LED array and a second LED array connected to the LED controller and the AC power switch detection.

The first LED array can include a color of approximately 2700K to approximately 3500K, and the second LED array can include a color of approximately 4000k to approximately 6000k.

The AC power switch detection can include an AC/DC converter and a micro-controller.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Figure 1:
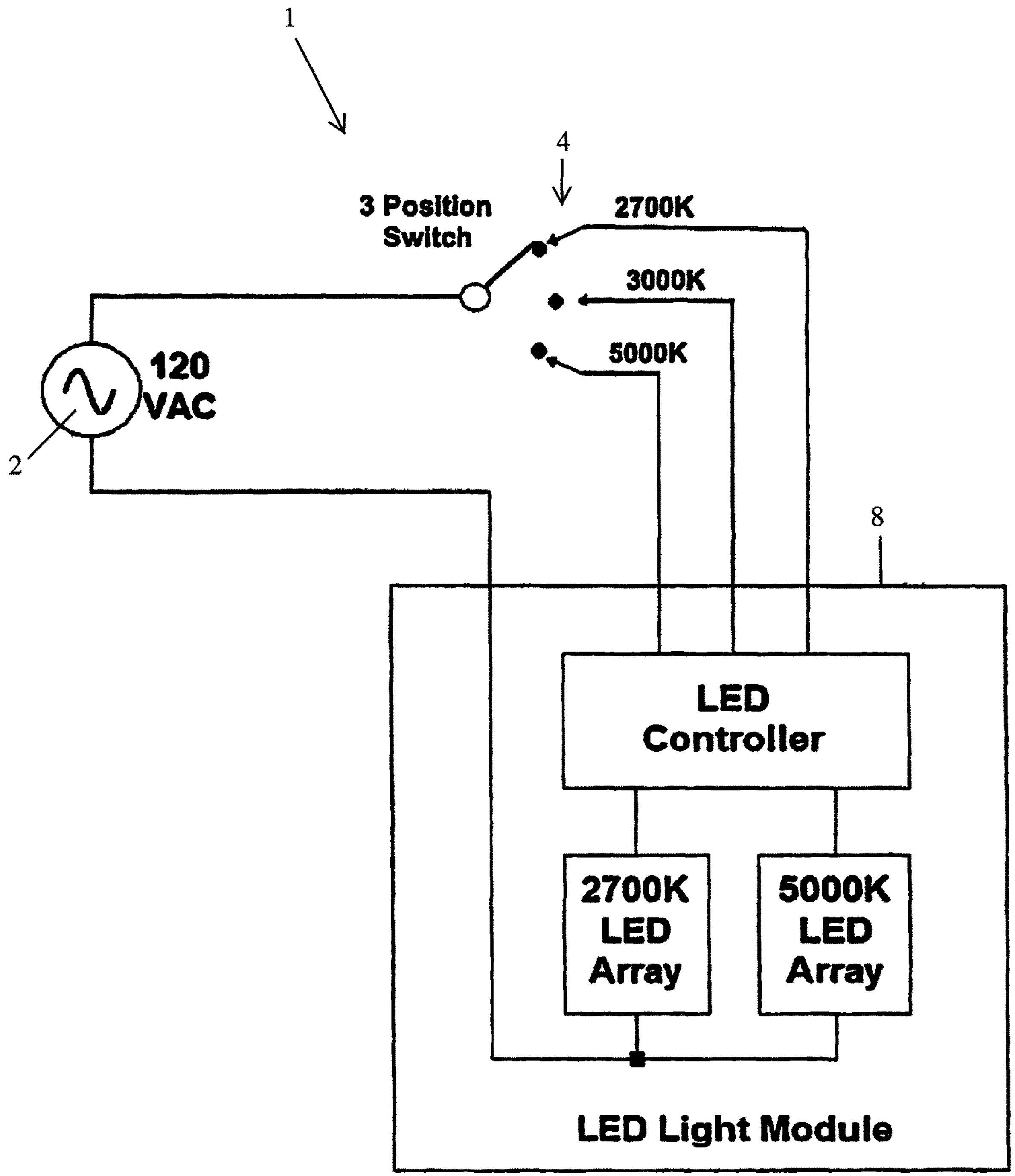
FIG. 1 (PRIOR ART)
FIG. 1 shows a prior art arrangement of a three-position mechanical switch for changing white light colors with circuit board having two LED arrays.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

1 Prior Art 3—Position mechanical switch arrangement with two LED arrays on circuit board.
2 120 VAC power supply
4 three position switch
8 circuit board having two arrays of LEDs
10 Circuit board with LED light module and AC power switch arrangement
15 AC Power switch
20 LED light module circuit board
22 diode D1
30 Resistor R1, such as but not limited to approximately 1000k ohm
35 Resistor R2 such as but not limited to approximately 91k ohm
40 Capacitor C1, such as but not limited to approximately 4.7 uf
50 AC-DC converter,
60 MCU microcontroller
62 A/D analog to digital converter

Figure 2:
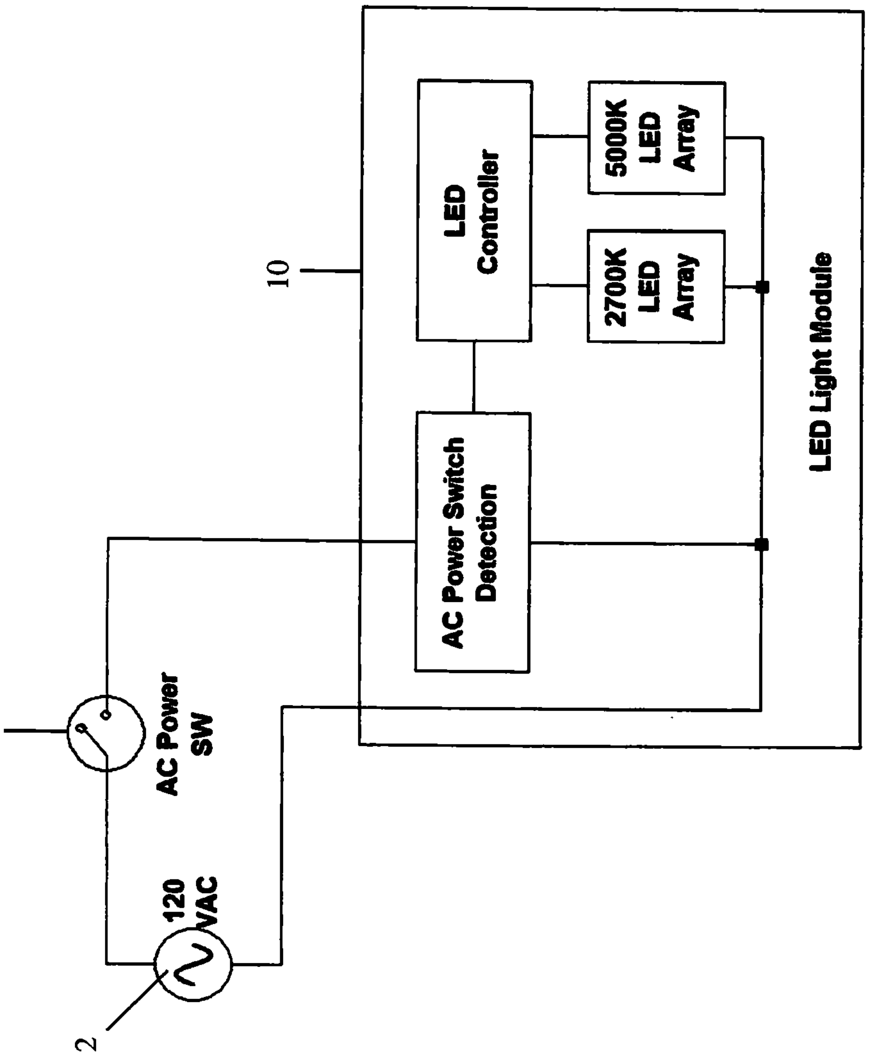
FIG. 2 shows a first embodiment circuit having two LED arrays with LED light module circuitry controlled by an AC (alternating current) power switch.

70 AC LED controller
80 2700K LED array
90 5000K LED array
100 Remote control embodiment for ceiling fan light or overhead light
110 remote control transmitter
112 light on/off button/switch
115 color control button
120 ceiling fan/LED light remote control receiver
130 ceiling fan motor
200 Wall control embodiment for overhead light
210 wall control First Embodiment FIG. 2 shows a first embodiment 10 circuit board having two LED arrays with LED light module circuitry controlled by an AC (alternating current) power switch 15 with 120 VAC power supply 2. The circuit board 20 can have two wires coming from the AC Power Switch 15 into the circuit board 20, instead of the four wires coming into the circuit board 8 as shown in the prior art circuit board of FIG. 1.

Figure 3:
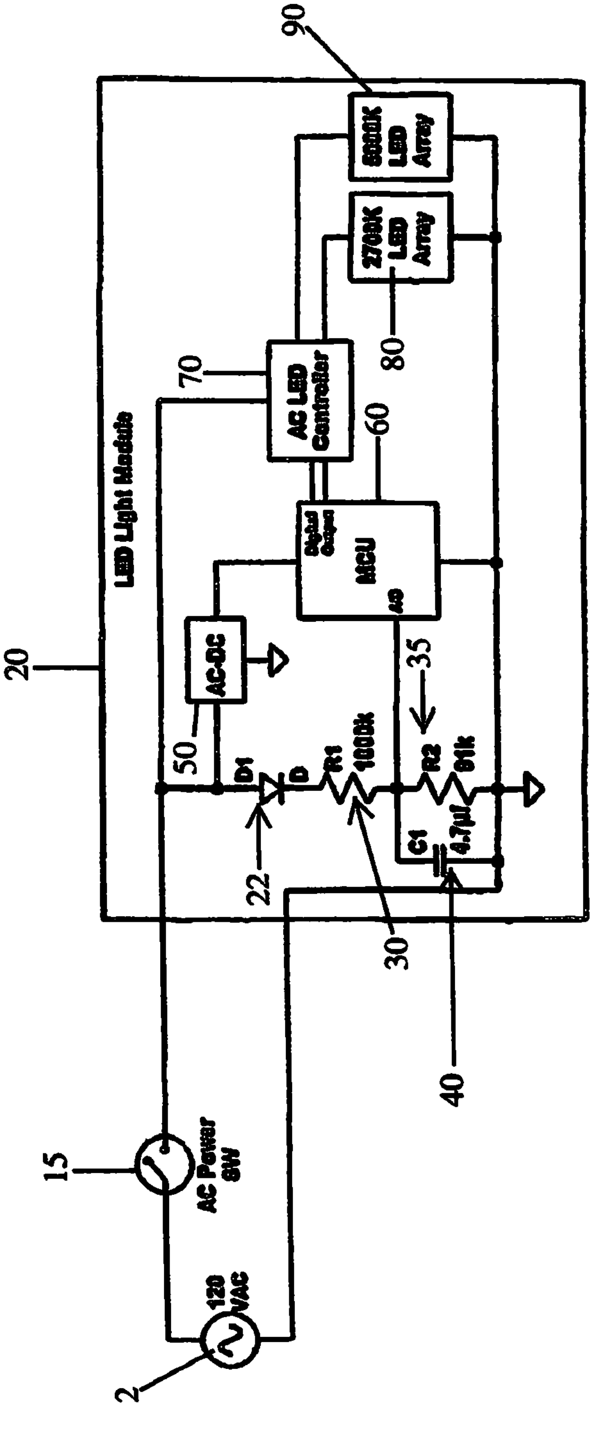
FIG. 3 shows the LED light module circuitry that can be used with FIG. 2.

FIG. 3 shows the LED light module circuitry 20 used in the circuit board 20 of FIG. 2.

Figure 4A:
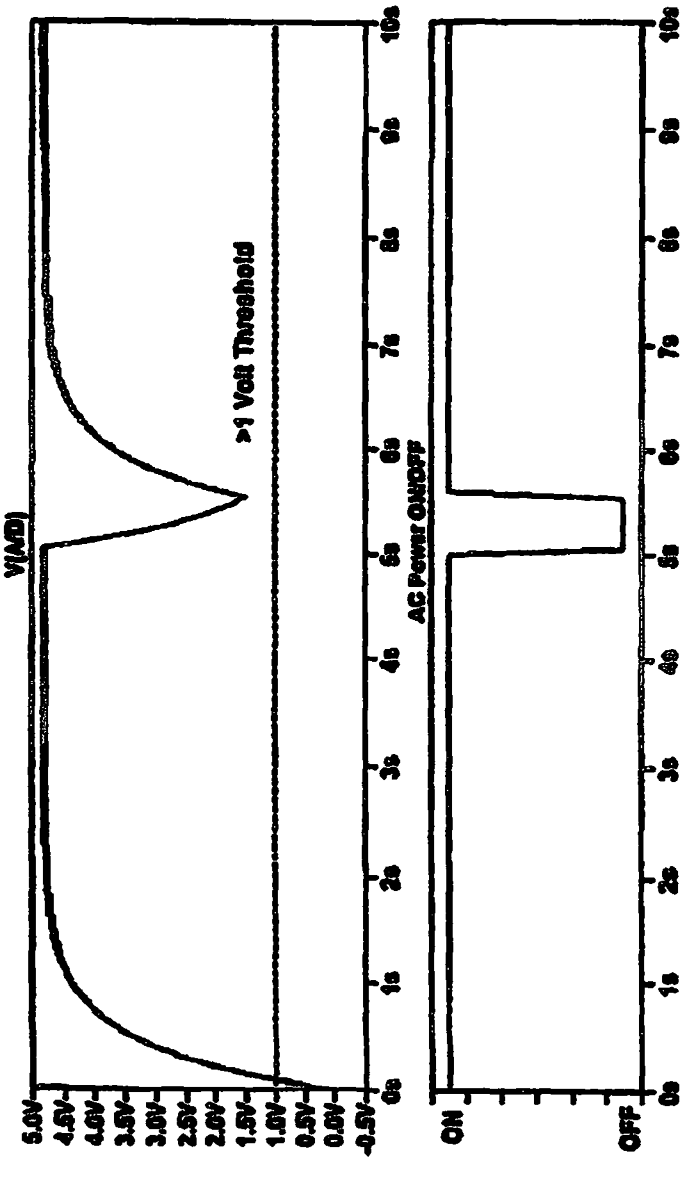
FIG. 4A is a graph of voltage versus time for a first case where power is switched quickly to the LED light module of FIGS. 2-3.

FIG. 4A is a graph of voltage versus time for a first case where power is switched quickly to the LED light module of FIGS. 2-3.

Figure 4B:
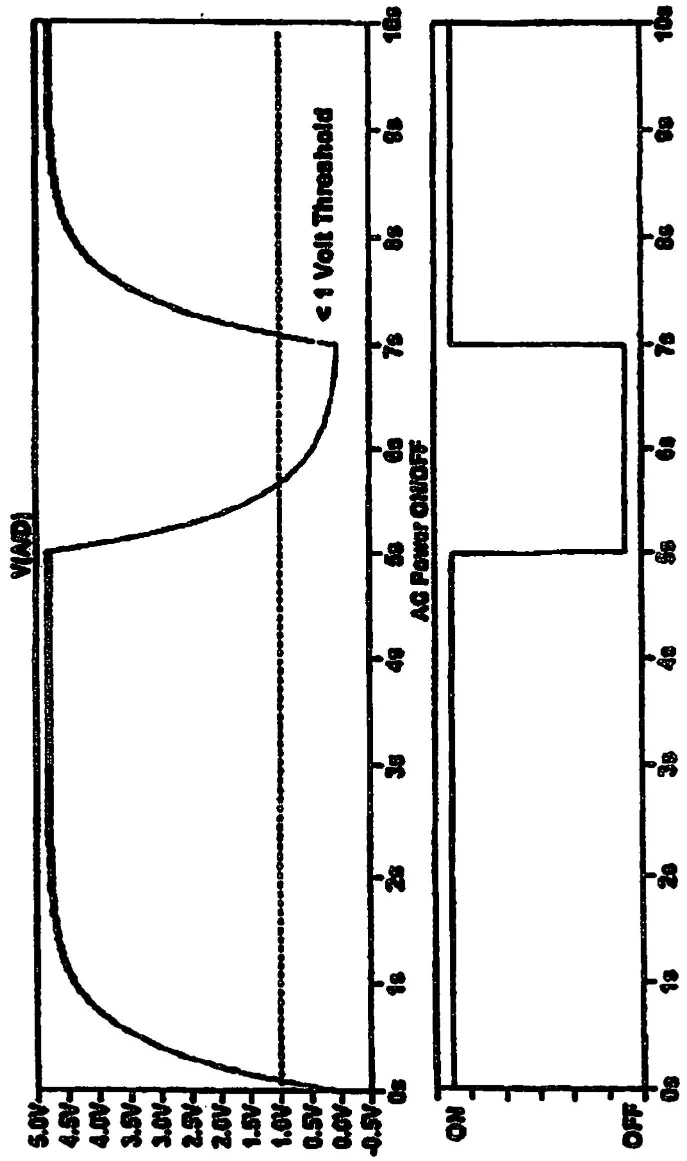
FIG. 4B is a graph of voltage versus time for a second case where power is switched slowly to the LED light module of FIGS. 2-3.

FIG. 4B is a graph of voltage versus time for a second case where power is switched slowly to the LED light module of FIGS. 2-3.

Figure 4C:
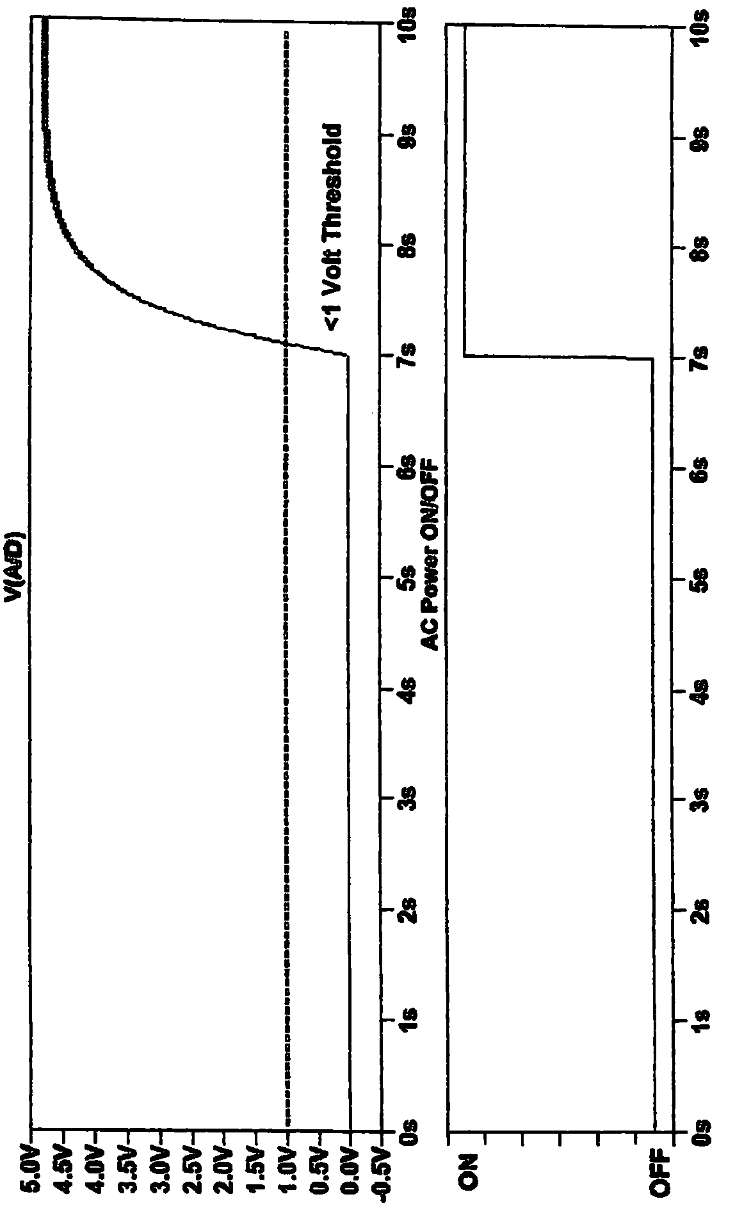
FIG. 4C is a graph of voltage versus time for a third case where power is switched on after being off for a very long time.

FIG. 4C is a graph of voltage versus time for a third case where power is switched on after being off for a very long time of FIGS. 2-3.

Figure 5:
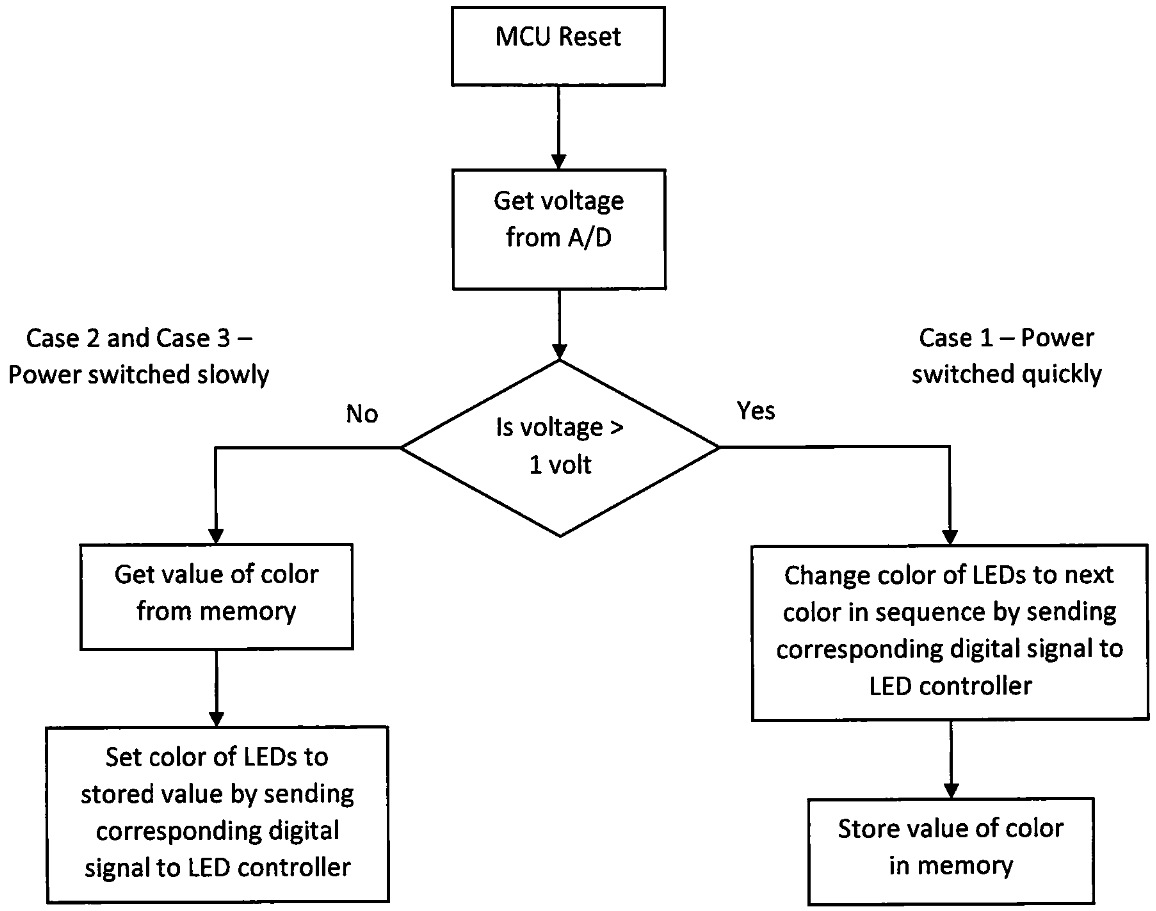
FIG. 5 is a flow chart running through case 1 of FIG. 4A, case 2 of FIG. 4B, and case 3 of FIG. 4C.

FIG. 5 is a flow chart running through case 1 of FIG. 4A, case 2 of FIG. 4B, and case 3 of FIG. 4C.

Case 1 Power Switched Quickly

Referring to FIGS. 2, 3, 4A and 5, the AC power switch 15 can be a wall switch such as but not limited to a rocker panel switch or toggle switch and the like. Case 1 stores the light color setting and when turned on again goes to next light color setting Under case 1, the AC power switch 15 can start off in a power on state for a period of time, such as but not limited to longer than approximately 5 seconds, and quickly switched off and on again quickly, in a short time period. For example, the short time period of being turned off can be for up to approximately 0.5 seconds. Following the short off state, the switch 15 can be quickly turned on, and the light emissions from the light coming from the LEDS goes to the next light color setting in the sequence.

When the AC power is switched off, the power from capacitor 40 discharges through resistor 35 to ground according to the freeform shown in FIG. 4A. Upon MCU 60 reset, the input voltage on the A/D (analog to digital converter) 62 is measured. If the measured voltage is greater than an approximately 1 volt threshold, the MCU 60 changes the LED color to the next color state in sequence by sending the corresponding digital signal to the LED controller and stores the color state in memory.

For example, if the previous on state of switch 15 had the light emitted from the LEDs to be 2700K, the quickly switched on state of the light goes to approximately 3000K. If the switch 15 is again turned off and quickly turned back on in a short period again of up to approximately 0.5 seconds, the light emitted from the LEDs goes to approximately 5000K. if the switch 15 is again turned off and quickly turned back on in a short period again of up to approximately 0.5 seconds, the light emitted from the LEDs goes back to approximately 2700K.

Further shutting the switch 15 off and quickly turning it back on continues the cycle of light emission sequences. For example, from approximately 3000K to approximately 5000K to approximately 2700K, and from approximately 5000k to approximately 2700K to approximately 3000K, and so on.

The order of light sequence in the color changing light system can be in the opposite order of described above, such as 5000k to 3000k to 2700k and back to 5000k and so on.

The color of the light system is controlled by the AC LED controller which regulates the power to each LED array to get a blended color. For example, to get 3000k color, more power is applied to the 2700k LED array and less power to the 5000k LED array.

While a cycle of light emission sequences shows 3 colors 2700k, 3000k, and 5000k being described, other color combinations can be used such as 2700k, 4000k, and 5000k.

Case 2 Power Switched Slowly

Referring to FIGS. 2, 3, 4B and 5, the AC power switch 15 can be a wall switch such as but not limited to a rocker panel switch or toggle switch and the like. Case 2 recalls the previous light color setting.

Under case 2, the AC power switch 15 can start off in a power on state for a period of time, such as but not limited to longer than approximately 5 seconds and switched off for a longer period and on again. For example, the long time period of being turned off can be greater than approximately 1 second to approximately 2 seconds or longer. Following the long off state, the switch 15 is turned on, and the light emissions from the light coming from the LEDS goes back to the last selected color setting.

For example, if the previous on state of switch 15 had the light emitted from the LEDs was approximately 2700K, the long period switched off and switched on state of the light remains at approximately 2700K. If the previous on state of switch 15 had the light emitted from the LEDs was approximately 3000K, the long period switched off and switched on state of the light remains at approximately 3000K. If the previous on state of switch 15 had the light emitted from the LEDs was approximately 5000K, the long period switched off and switched on state of the light remains at approximately 5000K.

When the AC power is switched off, the power from capacitor 40 discharges through resistor 35 to ground according to the freeform shown in FIG. 4B. Upon MCU 60 reset, the input voltage on the A/D 62 is measured. If the measured voltage is less than approximately 1 volt threshold, the MCU 60 recalls the previously selected color state from memory and powers on the LED arrays with the selected color by sending the corresponding digital signal to the LED controller.

Case 3 Power Switched on after being Off a Long Time, Such as Overnight

Referring to FIGS. 2, 3, 4C and 5, the AC power switch 15 can be a wall switch such as but not limited to a rocker panel switch or toggle switch and the like. Case 3 is similar to Case 2 and recalls the previous light color setting.

Under case 3, the AC power switch 15 can start in a power off state for a long period of time, such as but not limited to longer than approximately 10 seconds, and then switched on. After the light switch 15 is turned on, and the light emissions from the light coming from the LEDS goes back to the last selected color setting.

For example, if the previous on state of switch 15 had the light emitted from the LEDs was approximately 2700K, the long period switched off and switched on state of the light remains at approximately 2700K. If the previous on state of switch 15 had the light emitted from the LEDs was approximately 3000K, the long period switched off and switched on state of the light remains at approximately 3000K. If the previous on state of switch 15 had the light emitted from the LEDs was approximately 5000K, the long period switched off and switched on state of the light remains at approximately 5000K.

When the AC power is switched on, the power from capacitor 40 has been substantially discharged through resistor 35 to ground according to the freeform shown in FIG. 4C and the voltage of capacitor 40 is approximately 0 volts. Upon MCU 60 reset, the input voltage on the ND 62 is measured. Since the measured voltage is less than the approximately 1 volt threshold, the MCU 60 recalls the previously selected color state from memory and powers on the LED arrays with the selected color by sending the corresponding digital signal to the LED controller.

The short and long periods referenced in Case 1, Case 2 and Case 3 can vary. For example, if the short period turn off is up to approximately 1 second, the long period turn off can be greater than approximately 1 second, and the like.

The approximately 1 volt threshold referenced in Case 1, Case 2 and Case 3 can vary. For example it can be set to approximately 2.5 volts and the capacitor 40 and resistor 35 can be adjusted to provide the desired timing control.

Alternate Embodiment for AC Power Switch Detection

Figure 6:
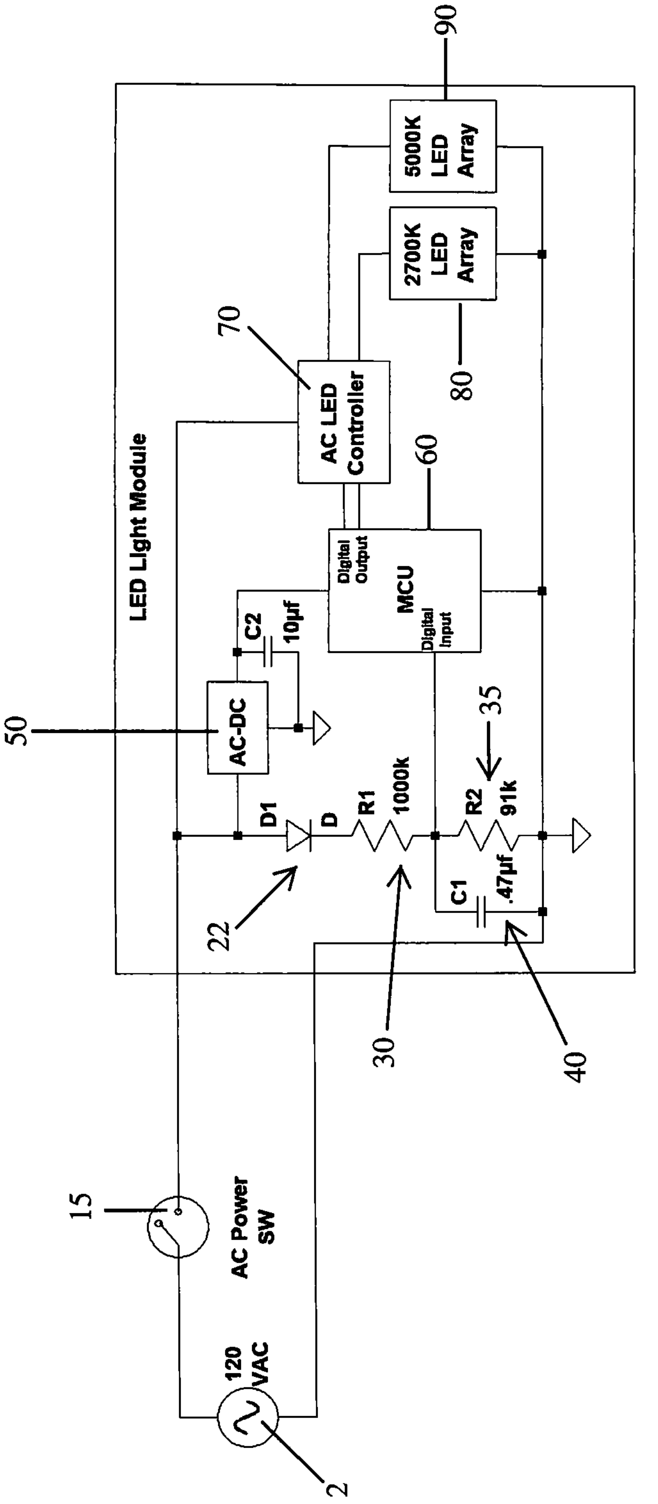
FIG. 6 shows an alternate embodiment for the AC power switch detection circuit of the LED light module circuitry that can be used with FIG. 2.

FIG. 6 shows an alternate embodiment for the AC power switch detection circuit of the LED light module circuitry 20 used in the circuit board 20 of FIG. 2.

Figure 7A:
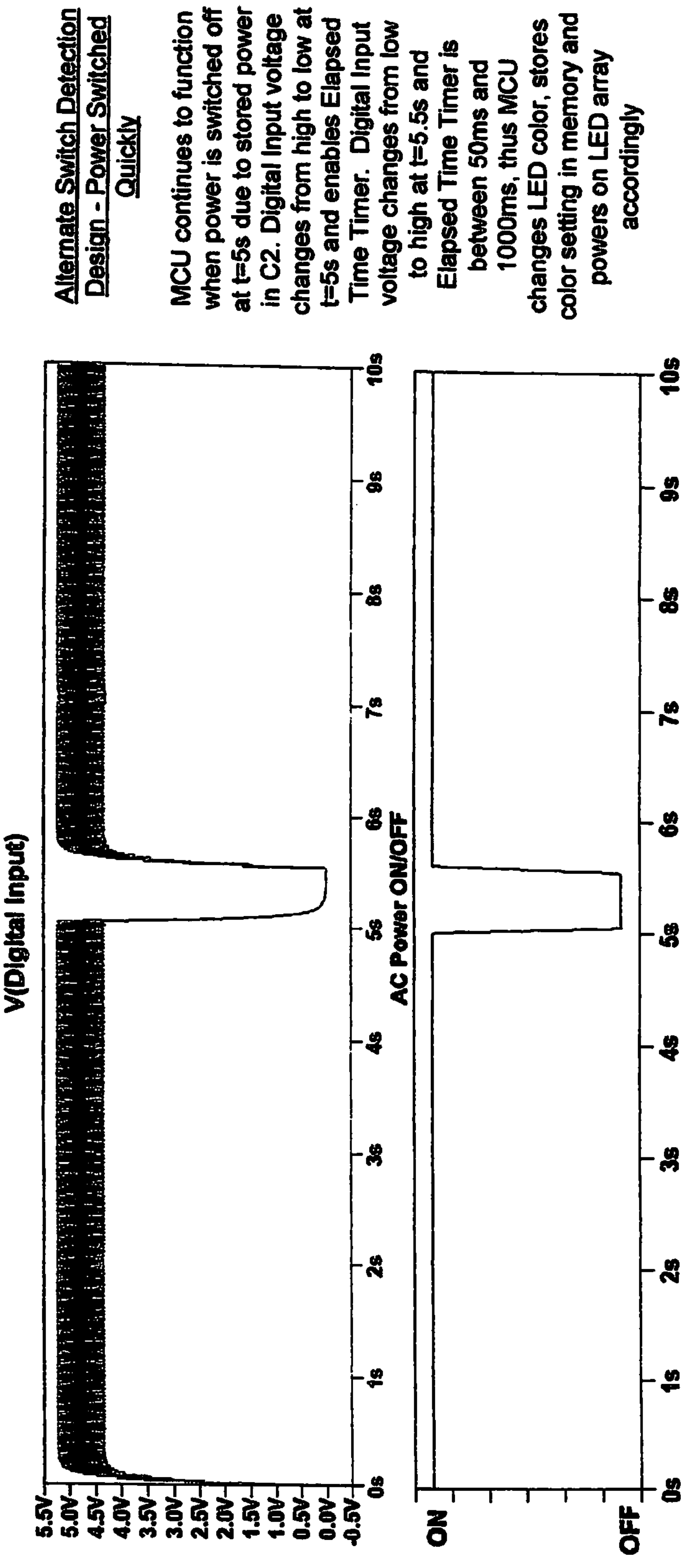
FIG. 7A is a graph of voltage versus time for a first case where power is switched quickly to the LED light module of FIGS. 2 and 6.

FIG. 7A is a graph of voltage versus time for a first case where power is switched quickly to the LED light module of FIGS. 2 and 6.

Figure 7B:
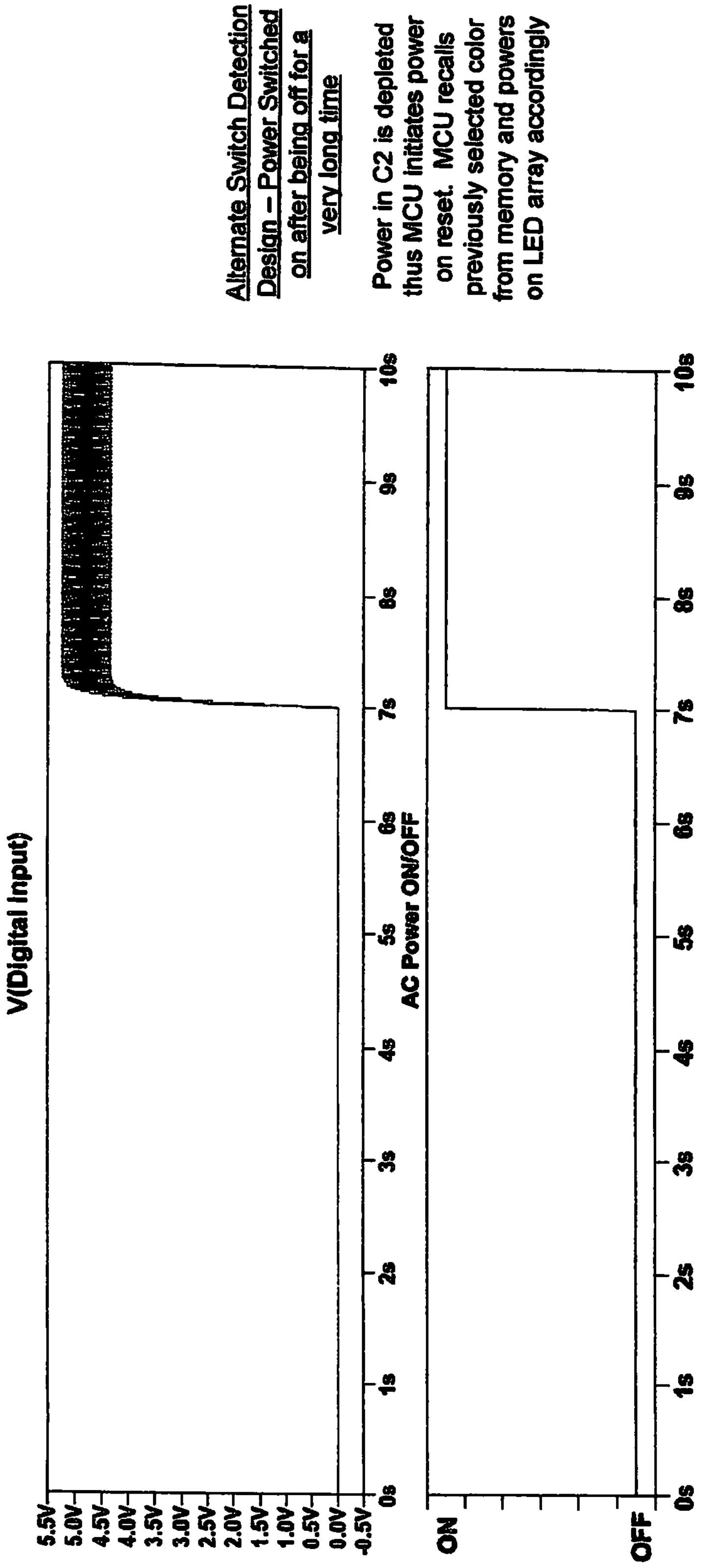
FIG. 7B is a graph of voltage versus time for a second case where power is switched on after being off for a very long time to the LED light module of FIGS. 2 and 6.

FIG. 7B is a graph of voltage versus time for a second case where power is switched on after being off for a very long time of FIGS. 2 and 6.

Figure 8:
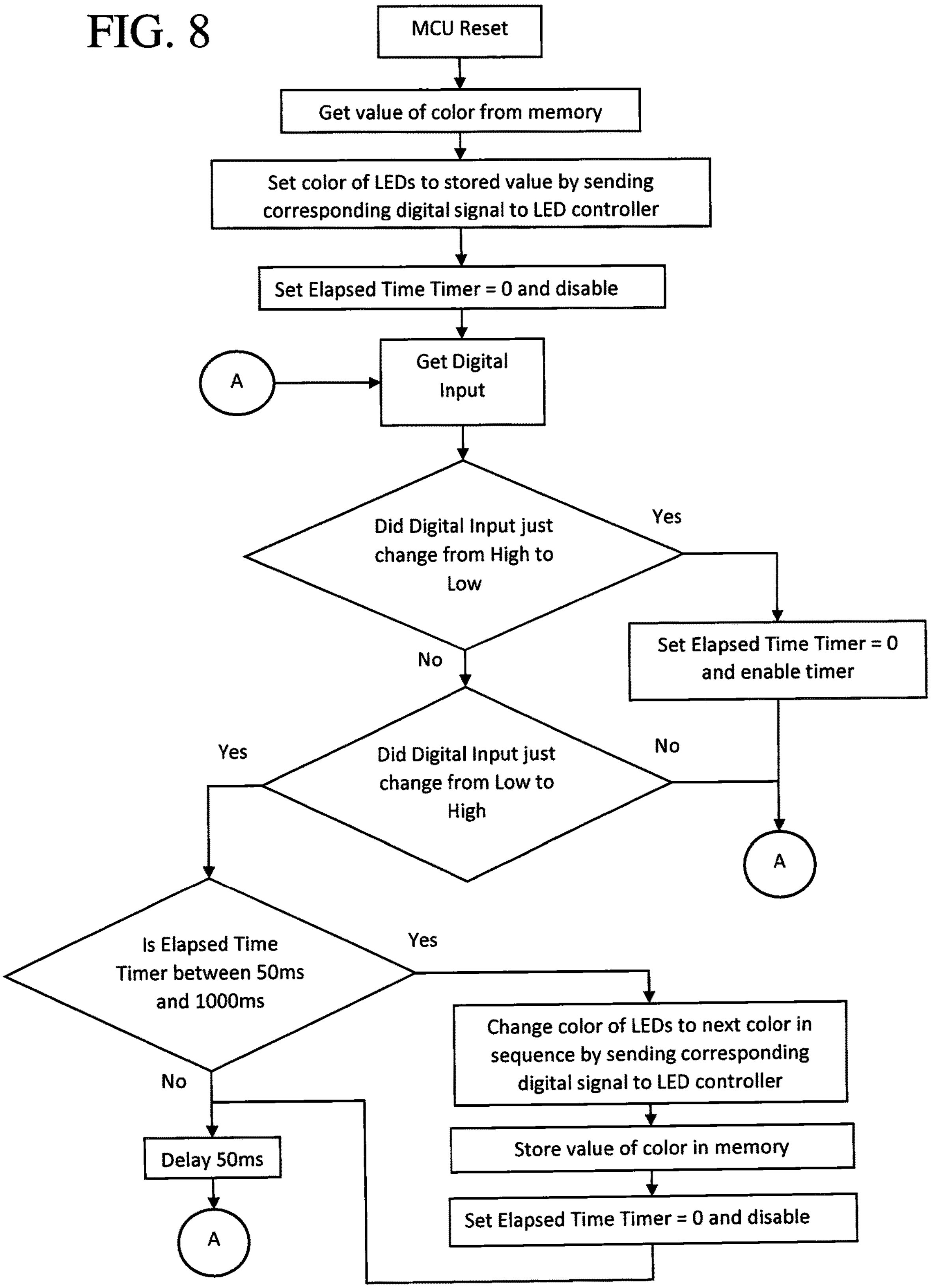
FIG. 8 is a flow chart running through case 1 of FIG. 7A and case 2 of FIG. 7B.

FIG. 8 is a flow chart running through cases of FIG. 7A and FIG. 7B.

Alternate Embodiment Case 1—Power Switched Quickly

Referring to FIGS. 2, 6, 7A and 8, the AC power switch 15 can be a wall switch such as but not limited to a rocker panel switch or toggle switch and the like. Case 1 stores the light color setting and when turned on again goes to next light color setting Under case 1, the AC power switch 15 can start off in a power on state for a period of time, such as but not limited to longer than approximately 5 seconds, and quickly switched off and on again quickly, in a short time period. For example, the short time period of being turned off can be for up to approximately 0.5 seconds. Following the short off state, the switch 15 can be quickly turned on, and the light emissions from the light coming from the LEDS goes to the next light color setting in the sequence.

When the AC power is switched off, the power from capacitor C2 allows MCU to continue to function. The voltage at Digital Input changes from high to low at t=5 s and enables Elapsed Time Timer to keep track of the elapsed time. At t=5.5 s, the AC power switch is turned back on and Digital Input voltage changes from low to high. Since the Elapsed Time Timer is between 50 ms and 1000 ms, the MCU changes the LED color to the next in sequence by sending the corresponding signal to the LED controller, stores the color setting in memory and powers on the LED array accordingly. It also resets and disables the Elapsed Time Timer and delays 50 ms before looping. The purpose of the delay is to ensure stable operation when the AC power is switched back on.

For example, if the previous on state of switch 15 had the light emitted from the LEDs to be 2700K, the quickly switched on state of the light goes to approximately 3000K. If the switch 15 is again turned off and quickly turned back on in a short period again of up to approximately 0.5 seconds, the light emitted from the LEDs goes to approximately 5000K. if the switch 15 is again turned off and quickly turned back on in a short period again of up to approximately 0.5 seconds, the light emitted from the LEDs goes back to approximately 2700K.

Further shutting the switch 15 off and quickly turning it back on continues the cycle of light emission sequences. For example, from approximately 3000K to approximately 5000K to approximately 2700K, and from approximately 5000k to approximately 2700K to approximately 3000K, and so on.

Alternate Embodiment Case 2—Power Switched on after being Off for a Long Time

Referring to FIGS. 2, 6, 7B and 8, the AC power switch 15 can be a wall switch such as but not limited to a rocker panel switch or toggle switch and the like. Case 2 recalls the previous light color setting.

Under case 2, the AC power switch 15 can start in a power off state for a long period of time, such as but not limited to longer than approximately 10 seconds, and then switched on. After the light switch 15 is turned on, and the light emissions from the light coming from the LEDS goes back to the last selected color setting.

For example, if the previous on state of switch 15 had the light emitted from the LEDs was approximately 2700K, the long period switched off and switched on state of the light remains at approximately 2700K. If the previous on state of switch 15 had the light emitted from the LEDs was approximately 3000K, the long period switched off and switched on state of the light remains at approximately 3000K. If the previous on state of switch 15 had the light emitted from the LEDs was approximately 5000K, the long period switched off and switched on state of the light remains at approximately 5000K.

Prior to the AC power being switched on, the power from capacitor C2 is depleted, thus when the power is switched on at t=7 s, the MCU initiates a power on reset. It then gets the value of the previously selected color from memory and sets the color of the LEDs to the value by sending the corresponding digital signal to the LED controller.

While two versions of the AC Power Switch Detection Circuitry have been shown for illustration purposes, additional ways and versions of detecting the quick switching and slow switching of the AC power line can be utilized without deviating from the scope of this invention.

While a cycle of light emission sequences consisting of 3 colors has been described, other sequences consisting of 4, 5 or 6 or more colors can be implemented as well. For example, a 5 light sequence of 2700k, 3000k, 3500k, 4000k and 5000k can be used.

While a 2700k LED array and a 5000k LED array has been described other color LED arrays can be used to achieve a wider color control, such as for example, 2200k to 6000k can be used.

Second Embodiment

Figure 9:
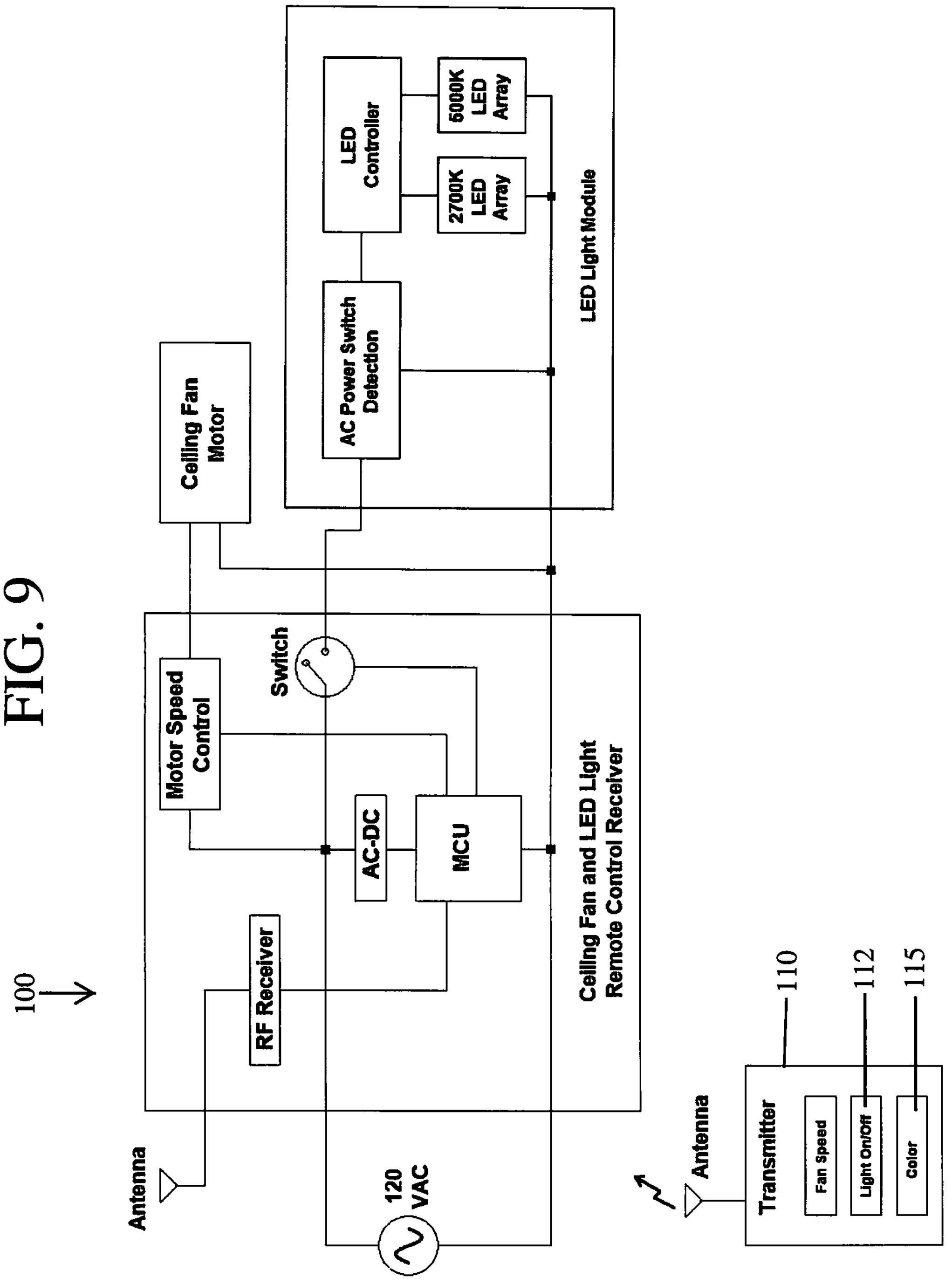
FIG. 9 shows a second embodiment of the LED light module of FIGS. 2, 3 and 6 installed in a ceiling fan light being controlled remotely by a remote control transmitter.

FIG. 9 shows a second embodiment 100 of the LED light module 20 of FIGS. 2, 3 and 6 installed in a ceiling fan light or overhead light 130 being controlled remotely by a remote control transmitter 110 for wireless control of the white LED colors. The transmitter 110 can include buttons/switches that are known for use with remote ceiling fan controls, such as fan on/off, fan speed. A ceiling fan/LED light remote control receiver 120 can be mounted with the ceiling fan/LED lights Here, the remote transmitter can also include a light on/off button/switch 112 and depressible color button/switch 115.

Case 1 Power Switched Quickly

Referring to FIGS. 2, 4A, 5 and 9, this embodiment 100 can operate similarly after light on/off switch 112 is switched on, to the case 1 scenario of the first embodiment shown and described in reference to FIGS. 2, 4A and 5 above is followed.

When the color button/switch 115 is depressed on the remote transmitter, the transmitter sends a command to the remote control receiver 120 MCU to switch the light on/off switch 112 off and then back on quickly according to the sequence described in case 1 scenario of the first embodiment. Since the quick off/on switching is controlled by the remote control receiver, the switching can be of a shorter duration and a more precise control then if a user were to do the switching manually. Additionally, it is more intuitive for the user since they only have to depress the color button/switch. The remote control receiver automates the color changing sequence.

Case 2 Power Switched Slowly

Referring to FIGS. 2, 4B, 5 and 9, this embodiment 100 can operate similarly after light on/off switch 112 is switched on, to the case 2 scenario of the first embodiment shown and described in reference to FIGS. 2, 4B and 5 above is followed.

When the light on/off button 115 is depressed on the remote transmitter to turn the LED module off, the transmitter sends a command to the remote control receiver 120 MCU to the light on/off switch 112 to turn the LED light module off. When the light on/off button 112 is depressed on the remote transmitter to turn the LED module on, the transmitter sends a command to the remote control receiver 120 MCU to the light on/off switch 112 to turn the LED light module on. When the time between these actions is the slow period of time as described in case 2 of the first embodiment, the LED light module recalls the previous light color. The remote control receiver can be designed to control the period of time between these actions to ensure that the light module turns on and off only and prevents color changing.

Case 3 Power Switched on after being Off a Long Time, Such as Overnight

Referring to FIGS. 2, 4B, 5 and 10, this embodiment 200 can operate similarly after light on/off switch 112 is switched on, to the case 3 scenario of the first embodiment shown and described in reference to FIGS. 2, 4B and 5 above is followed.

Referring to FIGS. 2, 4B, 5 and 10, this embodiment 200 can operate similarly after light on/off switch 112 is switched on, to the case 3 scenario of the first embodiment shown and described in reference to FIGS. 2, 4B and 5 above is followed.

Case 3 is similar to case 2 where the LED light module recalls the previous light color The second embodiment described above can work and apply to the alternate embodiment for AC power switch detection shown in FIG. 6.

Third Embodiment

Figure 10:
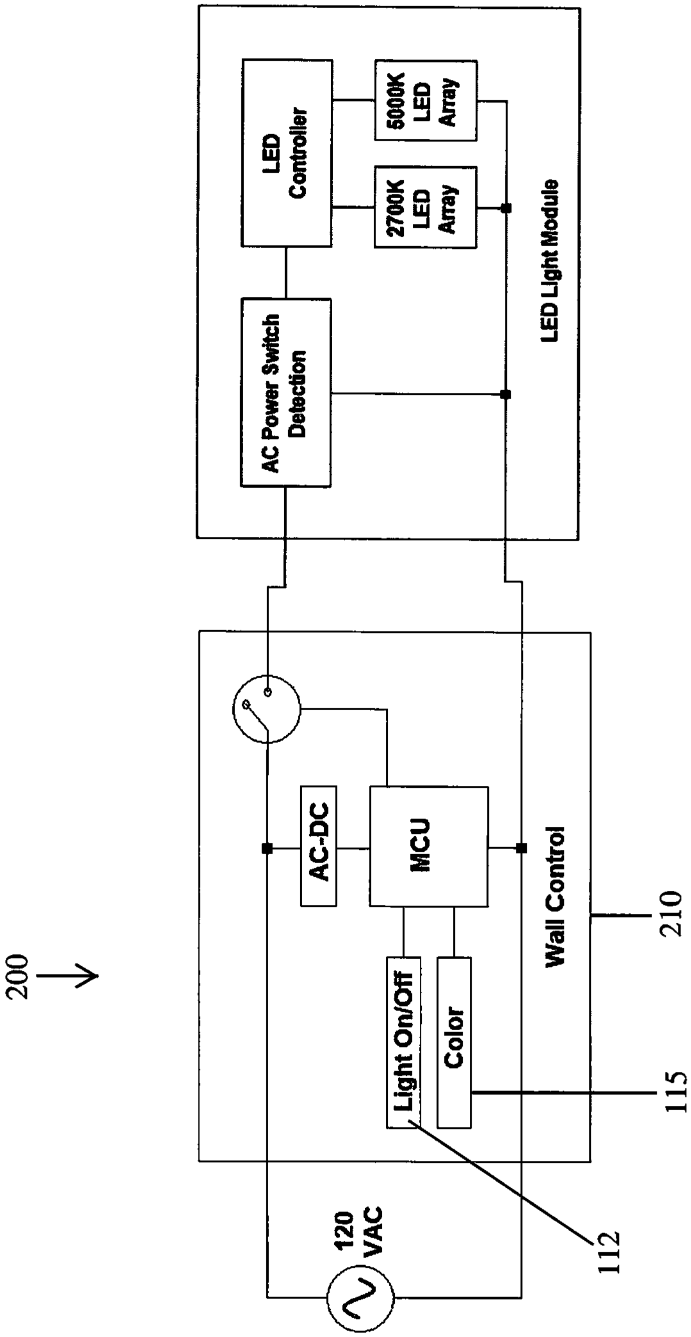
FIG. 10 shows a third embodiment of the LED light module of FIGS. 2, 3 and 6 installed in an overhead light being controlled remotely by a wall control.

FIG. 10 shows a third embodiment 200 of the LED light module 20 of FIGS. 2-3 installed in a ceiling fan light or overhead light 230 being controlled remotely by a wall control where the system is hardwired.

Case 1 Power Switched Quickly

Referring to FIGS. 2, 4A, 5 and 10, this embodiment 200 can operate similarly after light on/off switch 112 is switched on, to the case 1 scenario of the first embodiment shown and described in reference to FIGS. 2, 4A and 5 above is followed.

When the color button/switch is depressed on the wall control, the MCU controls the light on/off switch 112 to turn off and then back on quickly according to the sequence described in case 1 scenario of the first embodiment. Since the quick off/on switching is controlled by the wall control MCU, the switching can be of a shorter duration and more precise control then if a user were to do the switching manually. Additionally, it is more intuitive for the user since they only have to depress the color button/switch. The wall control automates the color changing sequence.

Case 2 Power Switched Slowly

Referring to FIGS. 2, 4B, 5 and 10, this embodiment 200 can operate similarly after light on/off switch 112 is switched on, to the case 2 scenario of the first embodiment shown and described in reference to FIGS. 2, 4B and 5 above is followed.

When the light on/off button 112 is depressed on the wall control to turn the LED module off, the MCU controls the light on/off switch 112 to turn the LED light module off. When the light on/off button 112 is depressed on the wall control to turn the LED module on, the MCU controls the light on/off switch 112 to turn the LED light module on. When the time between these off/on actions is the slow period of time as described in case 2 of the first embodiment, the LED light module recalls the previous light color. The wall control can be designed to control the period of time between these off/on actions to ensure that the light module turns on and off only and prevents color changing.

Case 3 Power Switched on after being Off a Long Time, Such as Overnight

Referring to FIGS. 2, 4B, 5 and 10, this embodiment 200 can operate similarly after light on/off switch 112 is switched on, to the case 3 scenario of the first embodiment shown and described in reference to FIGS. 2, 4B and 5 above is followed.

Case 3 is similar to case 2 where the LED light module recalls the previous light color The third embodiment described above can apply to the alternate embodiment for AC power switch detection shown in FIG. 6

The invention can work with lights that are part of ceiling fans, part of light kits that can be added to existing ceiling fans, and for any type of overhead lights, wall mounted lights, and the like.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A white color changing light system for white LED (light emitting diodes) lights, comprising:

an LED light module installed in an overhead light consisting of a plurality of only white LEDs (light emitting diodes); and a remotely located wireless single white color changing AC power button for remotely changing white light emitted from the overhead light to only selected white light settings between approximately 2200K to approximately 6000K, wherein the single white color changing AC power button is not mounted on or adjacent to the overhead light, wherein the single white color changing AC power button is an on and off AC power button which controls power in the LED light module and is limited to two wires for controlling all AC power to all of the white color changing light system in the LED light module;

a first operation, wherein turning the single white color changing AC power button from an on state to off state for a short period of time between 50 ms and approximately 2 seconds followed by turning the single white color changing AC power button back on changes a white light setting to go from a previous white light setting to a next white light setting in a series of solely white colors;

a memory in the light module for storing an existing selected white color setting based on the first operation; and a second operation wherein turning the single white color changing AC power button from an on state having the existing selected white color setting to off and after a long period of greater than approximately 2 seconds and turning the single white color changing AC power button back on repeats the existing selected white color light setting from the memory.

2. The white color changing light system of claim 1, wherein the overhead light includes:

2 LED arrays controlled independently to change the white color settings of the white light.

3. The white color changing light system of claim 1, further comprises:

an controller for controlling power to the LED light module, wherein activating the single white color changing AC power button by the MCU switches power off and on to the LED light module to change the white color settings of the white light.

4. The white color changing light system of claim 1, wherein the single white color changing AC power button includes:

a first light setting between approximately 2200K to approximately 2900K;

a second light setting between approximately 3000k to approximately 3900; and a third light setting between approximately 4000K to approximately 6000k.

5. The white color changing light system of claim 1, wherein the single white color changing AC power button includes:

a first light setting between approximately 2200K to approximately 2900K;

a second light setting between approximately 3000k to approximately 3800;

a third light setting between approximately 3900K to approximately 4500k; and a fourth light setting between approximately 4600K to approximately 6000k.

6. The white color changing light system of claim 1, wherein the single white color changing AC power button includes a first light setting of approximately 2200K;

a second light setting of approximately 2700k;

a third light setting of approximately 3000k;

a fourth light setting of approximately 5000k; and a fifth light setting of approximately 6000K.

7. The white color changing light system of claim 1, wherein if the previous light setting is a first white light setting between approximately 2200K to approximately 2900K, the next light setting is a second light setting between approximately 3000k to approximately 3900, and if the previous light setting is the second light setting between approximately 3000k to approximately 3900, the next light setting is a third light setting between approximately 4000K to approximately 6000k, and if the previous light setting is the third light setting between approximately 4000K to approximately 6000k, the next light setting is the first light setting between approximately 2200K to approximately 2900K.

8. The white color changing light system of claim 7, wherein if the existing white light setting is between approximately 2200K to approximately 2900K turning the light off for the long period to back on turns the light back on to between approximately 2200K to approximately 2900K, and if the existing light setting is between approximately 3000k to approximately 3900 turning the light off for the long period to back on turns the light back on to between approximately 3000k to approximately 3900, and if the existing light setting is between approximately 4000K to approximately 6000k turning the light off for the long period to back on turns the light back on to between approximately 4000K to approximately 6000k.

9. The white color changing light system of claim 1, wherein the LED light module includes:

an AC power switch detection;

an LED controller connected to the AC power switch detection; and a first LED array and a second LED array connected to the LED controller and the AC power switch detection.

10. The white color changing light system of claim 9, wherein the first LED array includes a white color of between approximately 2200K to approximately 3500K, and the second LED array includes a white color of between approximately 4000k to approximately 6000k.

11. The white color changing light system of claim 9, wherein the AC power switch detection includes:

an AC/DC converter; and a micro-controller.

12. A white color changing light system for white LED (light emitting diodes) light, comprising:

a LED light module installed in an overhead light consisting of a plurality of solely white LEDs (light emitting diodes);

a remotely located wireless single white color changing AC power button for remotely changing white light emitted from the overhead light to only selected white light settings between approximately 2200K to approximately 6000K, wherein the single white color changing AC power button is not mounted on or adjacent to the light;

a first operation wherein turning the single white color changing AC power button from an on state to an off state for a short period of time between 50 ms and approximately 2 seconds and turning the single white color changing AC power button back on changes a white light setting to go from a previous white light setting to a next white light setting in a series of white colors;

a memory in the light module for storing an existing selected white color setting based on the first operation scenario; and a second operation wherein turning the single white color changing AC power button from an on state having the existing selected white color setting to off and after a long period of greater than approximately 2 seconds and turning the single white color changing AC power button back on repeats the existing selected white light setting from the memory.

13. The white color changing light system of claim 12, wherein the light includes:

2 LED arrays controlled independently to change the white color settings of the white light.

14. The white color changing light system of claim 13, wherein the 2 LED arrays include:

a first LED array includes a white color between approximately 2200K to approximately 3500K, and a second LED array includes a white color between approximately 4000k to approximately 6000K.

15. The white color changing light system of claim 2, wherein the 2 LED arrays include:

a first LED array includes a white color between approximately 2200K to approximately 3500K, and a second LED array includes a white color between approximately 4000k to approximately 6000K.

16. The white color changing light system of claim 1, wherein the single white color changing AC power switch includes a first light setting of approximately 2700K;

a second light setting of approximately 3000k;

a third light setting of approximately 3500k;

a fourth light setting of approximately 4000k;

a fifth light setting of approximately 5000k; and a sixth light setting of approximately 6000K.

17. A white color changing light system for white LED (light emitting diodes) lights, comprising:

an LED light module installed in an overhead light consisting of a plurality of only white LEDs (light emitting diodes); and a remotely located wireless single white color changing AC power button for remotely changing white light emitted from the overhead light to only selected white light settings between approximately 2200K to approximately 6000K, wherein the single white color changing AC power button is not mounted on or adjacent to the overhead light, wherein the single white color changing AC power button is an on and off AC power button which controls power in the LED light module and is limited to two wires for controlling all AC power to all of the white color changing light system in the LED light module;

a first operation, wherein turning the single white color changing AC power button from an on state to off state for a short period of time between 10 ms and approximately 2 seconds followed by turning the single white color changing AC power button back on changes a white light setting to go from a previous white light setting to a next white light setting in a series of solely white colors;

a memory in the light module for storing an existing selected white color setting based on the first operation; and a second operation wherein turning the single white color changing AC power button from an on state having the existing selected white color setting to off and after a long period of greater than approximately 1 second and turning the single white color changing AC power button back on repeats the existing selected white color light setting from the memory.

18. The white color changing light system of claim 17, wherein the single white color changing AC power button includes a first light setting of approximately 2200K;

a second light setting of approximately 2700k;

a third light setting of approximately 3000k; and a fourth light setting of approximately 5000k.

19. The white color changing light system of claim 17, wherein the single white color changing AC power button includes a first light setting of approximately 2200K;

a second light setting of approximately 2700k;

a third light setting of approximately 3000k;

a fourth light setting of approximately 5000k; and a fifth light setting of approximately 6000K.

20. The white color changing light system of claim 17, wherein the single white color changing AC power switch includes a first light setting of approximately 2700K;

a second light setting of approximately 3000k;

a third light setting of approximately 3500k;

a fourth light setting of approximately 4000k;

a fifth light setting of approximately 5000k; and a sixth light setting of approximately 6000K.

* * * * *